United States Patent [19]
Bothe et al.

[11] Patent Number: 5,871,186
[45] Date of Patent: Feb. 16, 1999

[54] SUPPORT DEVICE

[75] Inventors: Klaus Bothe, Mönchnerstr. 1, 82057 Icking, Germany; Reinhard Hiesinger, Memminger Str. 41, 87724 Ottobeuren, Germany

[73] Assignees: Klaus Bothe, Icking; Reinhard Hiesinger, Ottobeuren; Kurt Mann, Fellheim, all of Germany

[21] Appl. No.: 932,107

[22] Filed: Sep. 17, 1997

[30] Foreign Application Priority Data

Sep. 17, 1996 [DE] Germany ............... 296 16 129 U

[51] Int. Cl.⁶ ................................... F16M 11/14
[52] U.S. Cl. ............................ 248/181.1; 248/178.1
[58] Field of Search .................. 248/177.1, 181.1, 248/187.1; 403/90, 122; 396/419, 428

[56] References Cited

U.S. PATENT DOCUMENTS

| | | | |
|---|---|---|---|
| 578,998 | 3/1897 | Loebs | 403/90 |
| 596,207 | 12/1897 | Hart | 403/90 |
| 1,272,574 | 7/1918 | Thomas | 248/187.1 |
| 1,473,273 | 11/1923 | Zink | 403/90 |
| 1,539,277 | 5/1925 | Schenck | 403/90 |
| 2,536,170 | 1/1951 | Guest | 248/177.1 |

FOREIGN PATENT DOCUMENTS

| | | |
|---|---|---|
| 881607 | 5/1943 | France . |
| 2840059 | 3/1980 | Germany . |
| 4202825 | 8/1993 | Germany . |
| 618296 | 2/1949 | United Kingdom . |

*Primary Examiner*—Leslie A. Braun
*Assistant Examiner*—Robert Lipcsik
*Attorney, Agent, or Firm*—Jacobson, Price, Holman & Stern, PLLC

[57] ABSTRACT

A support device, in particular for a camera or the like, comprises a stand with a holder. The holder is connected to the stand by a ball-and-socket joint with a socket constructed as a bridge (1). The bridge (1) has a width which is narrower than the diameter of the ball of the ball-and-socket joint.

6 Claims, 3 Drawing Sheets

SUPPORT DEVICE

BACKGROUND OF THE INVENTION

The invention relates to a support device comprising a stand with a holder, in particular for a camera and the like, the holder being connected to the stand via a ball-and-socket joint comprising a ball and socket.

Such stands have been disclosed in various constructions. DE-OS 4 202 825 describes a stand in which the camera holder is connected to the stand by means of a ball-and-socket joint. In this joint, the socket overlaps the ball by more than half, as a result of which the swivelling ability of the ball-and-socket joint is severely limited. Furthermore, a comparatively small ball is provided, which results in limited stability when the camera is attached.

BRIEF SUMMARY OF THE INVENTION

The object of the invention is to provide a stand with a holder, which achieves a high swivelling ability of the ball-and-socket joint.

To achieve this object, the invention starts from a stand with a holder, in particular for a camera and the like, the holder being connected to the stand via a ball-and-socket joint comprising a ball and socket, and proposes that the socket is constructed as a bridge, the bridge having a width which is narrower than the diameter of the ball.

As a result of such a construction of the socket, a high swivelling ability of the bridge on the ball is achieved, so that the stand can be employed for many uses.

Advantageously, the ball is connected fixedly to the stand and the bridge is connected fixedly to the camera holder. However, the arrangement can also be interchanged, for example the bridge is then connected to the stand. The ball-and-socket joint is then the only movable point between the camera and stand. An optimum swivelling ability is achieved by the bridge-like construction, the bridge favourably overlapping the ball to beyond the radius on two opposite sides and having a recess for the curves of the ball. The bridge thus sits firmly on the ball, in either the unlocked or fixed state, and can be swivelled, but cannot be removed from the ball. A swivelling range of the holder or of the attached camera by more than 360° is thus possible in the entire range of the ball.

It is advantageous if the bridge is flattened on its upper side.

The flattened upper side advantageously accommodates the holder for the cameras and its length is approximately twice the ball diameter. With this simple type of camera holder, no further operational step is necessary to attach, for example, plates or the like to the socket of the ball-and-socket joint.

Since the ball has a comparatively large diameter, an optimum supporting surface for the camera also results on the upper side of the bridge without further aids such as, for example, plates or the like, or the plate or support which serves to hold the camera is integrated in the bridge.

In the preferred embodiment of the invention, a peg with an external thread is provided as the holder for the camera. Such a peg is inserted into a bore present in the upper side of the bridge, and fits into a customary internal thread on the underneath of cameras. Further stabilization of the camera can be achieved by appropriate construction of the supporting surface on the upper side. The peg with the thread is screwed into a corresponding bore on the camera with a knurled wheel, and thereby fixes the camera.

In the preferred embodiment of the invention, two different means, such as a handle with a screw and a knurled screw, are provided for fixing and locking tile bridge on the ball. The handle with the screw serves for fixings the camera also being held manually in the desired position, and the knurled screw locking the camera in the desired position, for example if it is to remain in the same position for a relatively long time.

On known stands, the device for fixing and the device for locking are arranged on two different sides of the ball-and-socket joint, so that after the joint has been locked and fixed, in the worst case the socket and ball are connected only via two points. This reduces the stability when the camera is attached.

The two means for fixing and locking are advantageously arranged on the same side of the bridge. This results, when both the screw and the knurled screw are tightened and hold the bridge on the ball, in a comparatively large supporting surface for the ball on the inside of the bridge. Since the two screws press against the ball from the sane side, the side of the ball opposite the screws is pressed against the inside of the bridge. Due to the enlarged supporting surface when the bridge is locked on the ball, a higher stability towards unintentional swivelling of the bridge results. The friction is increased significantly in this manner.

In the preferred embodiment of the invention, a locking screw is provided for both fixing and locking.

In another embodiment of the invention, a single means is sufficient for the fixing and locking, it being possible, for example, for various positions of the screw to be provided for the fixing and locking. This mode of construction is particularly simple and favorable to produce, and also has tile advantage of increased friction.

Figure 1:
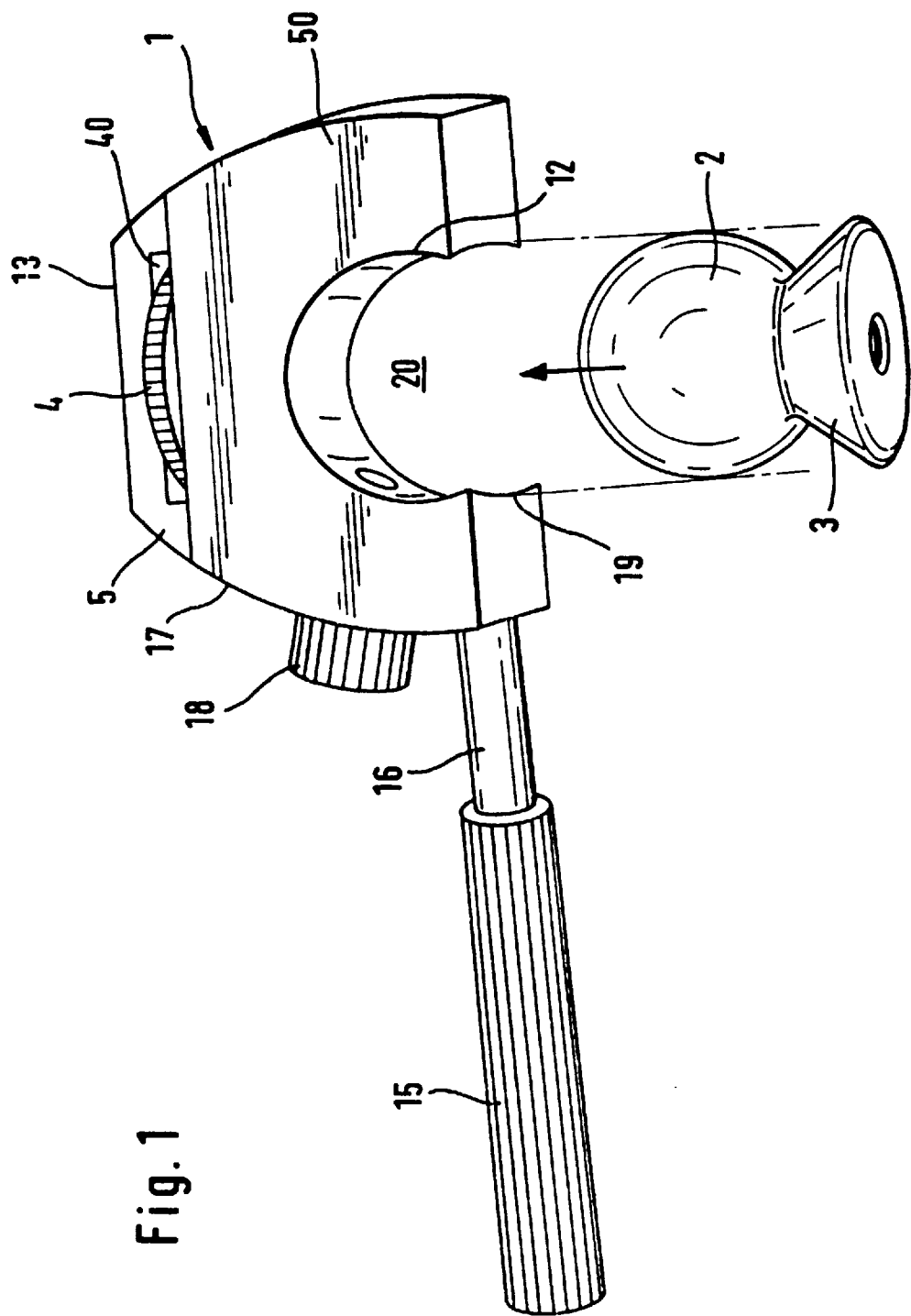
FIG. 1 shows a perspective view of a ball with a bridge according to the invention.
Figure 2:
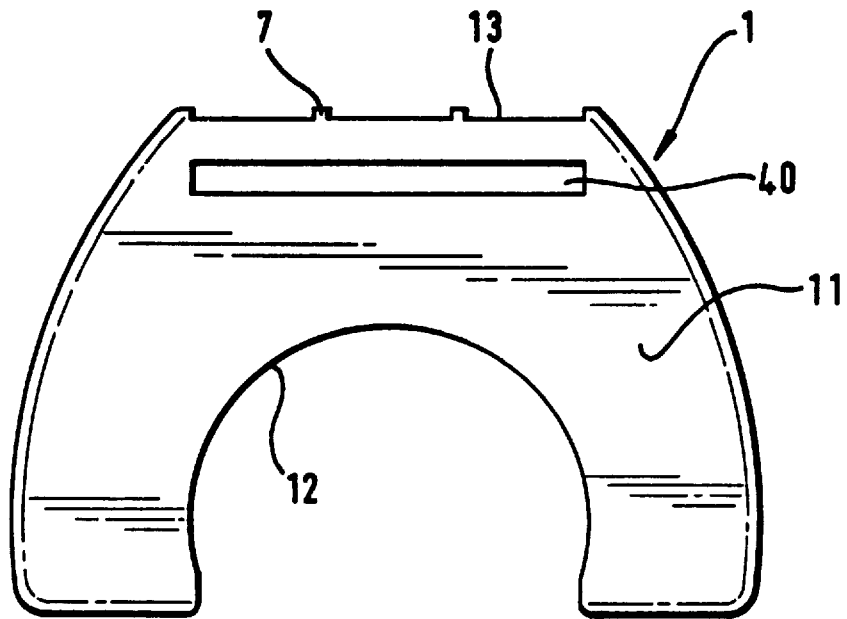
FIG. 2 shows a side view of a bridge according to the invention.
Figure 3:
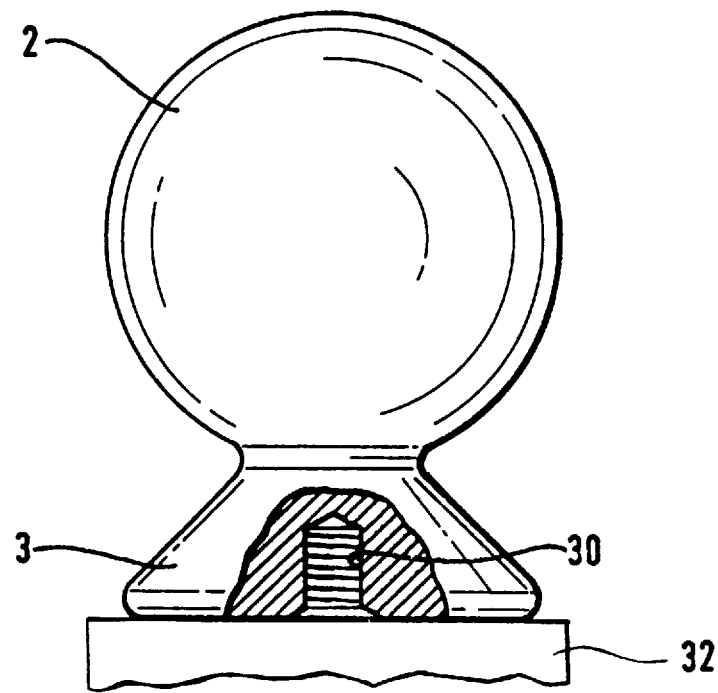
FIG. 3 is a view of a ball, partly in section, according to the invention.
Figure 4:
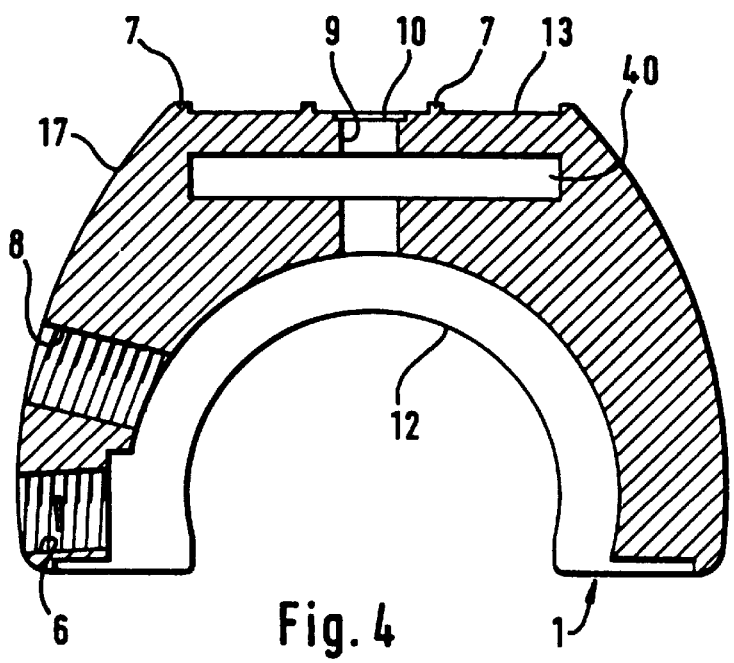
FIG. 4 is a section through a bridge according to the invention.
Figure 5:
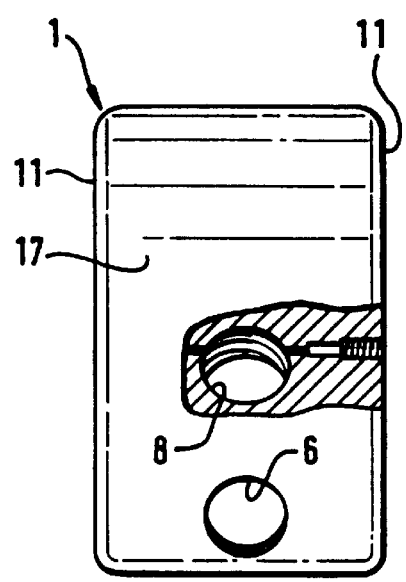
FIG. 5 is a side view of a bridge according to the invention and FIG. 6 is a plan view of a bridge according to the invention.
Figure 6:
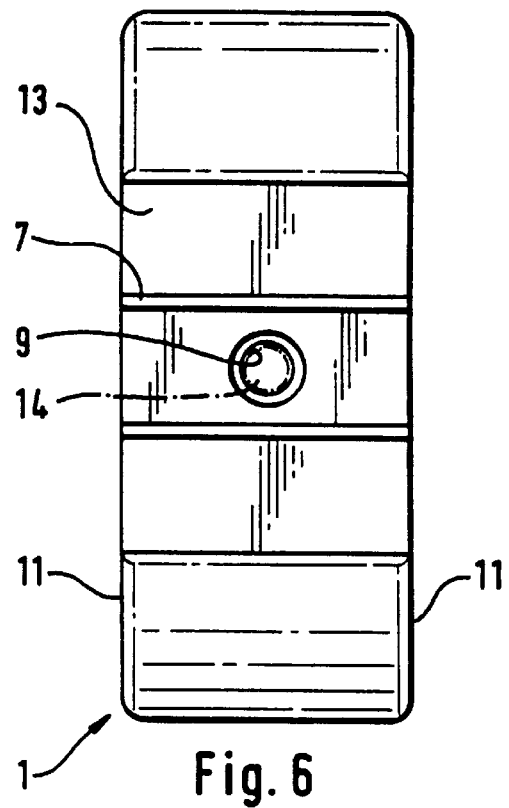

Referring first to FIG. 1, a ball 2 sits on a stand, the ball 2 being immovable on the stand. The ball 2 has, on its under-side, a cone-shaped base 3, which has a bore 30 (see FIG. 3) with a thread to connect the ball 2 to the stand.

The bridge 1 has a recess 12 in which the ball 2 engages. The dimensions of the ball 2 and the width of the bridge 1 are chosen such that the sides 20 of the ball 2 project beyond the bridge 1. The inner surface 19 of the recess 12 of the bridge 1 is spherical or crowned in shape, in order to fit optimally to the curvature of the ball 2. This results in a free mobility of the bridge 1 on the ball 2, 360° rotatability around the axis of the stand fixing bore 30 and tilting of, for example, at least 200° around a horizontal axis being possible.

The bridge 1 is provided as a movable socket on the ball 2, and overlaps the ball 2 beyond its radius. For mounting the camera, the upper side 13 of the bridge is flattened and forms a rectangle, the length of which is about twice the ball diameter. The flattened upper side 13 accommodates the camera, this being held by means of the peg 14 on the upper side (13). The peg 14 thus forms the camera holder 10 and can be rotated with the aid of the knurled wheel 4.

The knurled wheel 4 sits in the slot 40, so that it is freely movable, the slot 40 being provided, for example, as a recess of an attachment 5. The attachment 5 and main component 50 thus form the bridge 1 and are connected to one another, for example, by screws or the like on the flattened upper side 13. However, the bridge can also be constructed as one piece, in which case the holder for the camera or the like is constructed differently.

The camera can be screwed onto the camera holder 10 by means of the knurled wheel 4, without the camera having to be rotated. This is of advantage irk particular in the case of heavy cameras. The external thread of the peg 14 corresponds to the internal thread such as is usually arranged on the under-side of a camera. Quick-change plates and the like, for example, are also fixed to the holder 10, and then accommodate the camera or other elements, for example a flash unit, spotlight or the like.

The handle 15 with the screw 16 is provided for fixing the bridge 1 on the ball 2, the bore 6 being provided for the screw 16. By rotating the handle 15, fixing of the bridge 1 on the ball 2 is achieved, so that the camera can no longer be moved. The handle 15 is provided for fixing as well as for swivelling the camera, and has ribbing on the upper side. If the camera is to remain in the same position for a relatively long time, it is locked in position with the aid of the knurled screw 18. The bore 8 on the same side 17 of the bridge 1 as the bore 6 is provided for the knurled screw 18. For fixing, the ball 2 is pressed only gently against the bridge 1 with the aid of the screw 16, and in particular against that part of the bridge which lies between the recesses 12 opposite the bore 6. For locking, that is to say for locking the ball-and-socket joint, a further knurled screw 18 presses the ball 2 from the sane side against the inside of the bridge 1. A comparatively large supporting surface of the ball 2 on the bridge 1 is obtained in this manner.

It is furthermore also envisaged that a plate is provided on the locking or fixing means, which presses against the ball and thus effects locking in a region of larger area.

In another embodiment of the invention, which is not shown in more detail, a single screw, for example, which, in two positions, both fixes and locks the ball-and-socket joint is sufficient.

The flattened upper side 13 of the bridge 1 has, for example, ribbing 7 which serves to hold the camera in the desired position. Such an effect can also be achieved by suitable coverings on the upper side 13, such as, for example, rubber, synthetic material or the like. The bore 9, which ends in the slot 40 in which the knurled wheel 4 sits, is provided in the upper side 13 for the peg 14.

The edges and corners of the bridge are advantageously rounded off slightly, which results in a pleasant appearance and a reduction in the risk of injury. The bridge and ball are preferably made of metal, while the handle 15, knurled screw 18 and knurled wheel 4 are made, for example, of plastics material.

To produce the bridge, it is envisaged, for example, to use a substantially U-shaped extruded part profile, into which the spherical or crowned inner surfaces are incorporated.

To assemble the ball-and-socket joint, that is to say to mount the bridge 1 on the ball 2, it is envisaged, for example, that the lower region of the bridge, which overlaps the radius of the ball 2, is constructed such that it can be removed, that is to say, for example, is fixed to the bridge by screws or the like.

Another possibility is to produce the bridge from two substantially identical U-shaped components, both components having only an inner surface inclined on one side, giving, when brought together, the crowned or spherical inner surface 12.

The stand 32 according to the invention can be used not only in the field of photography, but is also employed, for example, in the use of spotlights or loudspeakers which are to be installed and fixed in any desired orientation in a quick manner with the aid of the stand.

It is also possible, however, to use the ball-and-socket joint according to the subject matter of the invention, for example, in scaffolding or the like.

The stability of the stand is achieved by using a relatively large ball 2. In respect of the use for cameras, for example, it is envisaged that the ball will have a diameter corresponding to one third or half the edge length of the base plate of the camera. Due to the relatively large construction, transmission of shocks, vibrations and the like is reliably avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A support device comprising:

a stand, a holder for securing a supported member thereto, a ball-and-socket joint comprising a ball and socket interconnecting said stand and said holder, said socket being a U-shaped bridge having two arms, the bridge having a width narrower than a diameter of said ball, said socket being secured to said holder, said bridge overlapping said ball, beyond a radius of said ball, on two opposite sides and having a recess for receiving said ball, and an axially elongated handle threadedly engaged with said bridge at one end and a knurled screw having threads thereon, both said handle and knurled screw for fixing and locking said bridge on said ball, said screw and said knurled screw being arranged on a same side and in one arm of said bridge, whereby said knurled screw is adapted to be used for long term securement and said axially elongated handle is adapted to be used for short term securement.

2. A device according to claim 1, wherein said ball is connected fixedly to said stand and said bridge is connected fixedly to said holder.

3. A device according to claim 1, wherein said bridge is flattened on an upper side thereof.

4. A device according to claim 3, wherein the length of said flattened upper side in not more than twice the diameter of said ball.

5. A device according to claim 3, wherein said upper side accommodates said holder.

6. A device according to claim 1, wherein a peg with an external thread is provided as said holder.

* * * * *